United States Patent [19]

Sörensen

[11] Patent Number: 5,090,180

[45] Date of Patent: Feb. 25, 1992

[54] METHOD AND APPARATUS FOR PRODUCING SEALED AND FILLED CONTAINERS

[75] Inventor: Erling Sörensen, Odense, Denmark

[73] Assignees: A/S Haustrup Plastic, Langeskov; A/s PLM Haustrup Holding, Odense, both of Denmark

[21] Appl. No.: 571,605

[22] PCT Filed: Dec. 22, 1989

[86] PCT No.: PCT/SE89/00747

§ 371 Date: Oct. 3, 1990

§ 102(e) Date: Oct. 3, 1990

[87] PCT Pub. No.: WO90/07451

PCT Pub. Date: Jul. 12, 1990

[51] Int. Cl.$^5$ ............ B65B 61/24; B65B 43/00; B65B 3/02; B65B 7/28

[52] U.S. Cl. .................. 53/471; 53/486; 53/281; 53/289; 53/329.3

[58] Field of Search .......... 53/486, 452, 453, 441, 53/442, 471, 478, 559, 558, 289, 290, 373, 329.3; 156/69

[56] References Cited

U.S. PATENT DOCUMENTS

| 2,124,959 | 7/1938 | Vogel | 53/471 |
|---|---|---|---|
| 3,103,089 | 9/1963 | Allen | 53/471 |
| 3,104,506 | 9/1963 | Rohdin | 53/453 X |
| 3,117,873 | 1/1964 | Bartels et al. | 53/486 X |
| 3,342,009 | 9/1967 | Anderson | 53/486 X |
| 3,353,325 | 11/1967 | Jensen et al. | 53/471 X |
| 3,449,183 | 6/1969 | Zelnick | 53/486 X |
| 3,492,773 | 2/1970 | Bergstrom | 53/453 |
| 3,517,475 | 6/1970 | Balocca | 53/471 X |
| 3,521,422 | 7/1970 | Tabor | 53/453 X |
| 3,526,186 | 9/1970 | Cornelius | 53/453 X |
| 4,338,765 | 7/1982 | Ohmori et al. | 53/289 X |
| 4,381,279 | 4/1983 | Jakobsen et al. | |
| 4,684,025 | 8/1987 | Copland et al. | |
| 4,796,411 | 1/1989 | Kimura et al. | 53/486 X |
| 4,807,424 | 2/1989 | Robinson et al. | 53/289 X |
| 4,835,942 | 6/1989 | Skrmetta | 53/559 X |
| 4,967,538 | 11/1990 | Leftault, Jr. et al. | 53/486 X |

FOREIGN PATENT DOCUMENTS 0282941 9/1988 European Pat. Off. .

Primary Examiner—Horace M. Culver
Attorney, Agent, or Firm—Ladas & Parry

[57] ABSTRACT

A method and apparatus for producing a sealed and filled container in which a preform of crystallizable plastic material having a body, a closed bottom portion and an open mouth portion is filled with the goods to be sealed therein whereafter a mechanical forming and thermocrystallizing tool is applied against the closed bottom of the preform, with pressure, to reshape the bottom of the preform by displacing at least a portion of the bottom of the preform inwardly of the body towards the open mouth of the preform. The tool is heated so that the temperature of the bottom portion is greater than the glass transition temperature (Tg) of the plastic material and the tool is maintained in contact with the bottom portion during its reshaping for a length of time sufficient for the plastic material to obtain a total crystallization of at least 15%. The open mouth portion is sealed to produce a sealed and filled container.

20 Claims, 4 Drawing Sheets

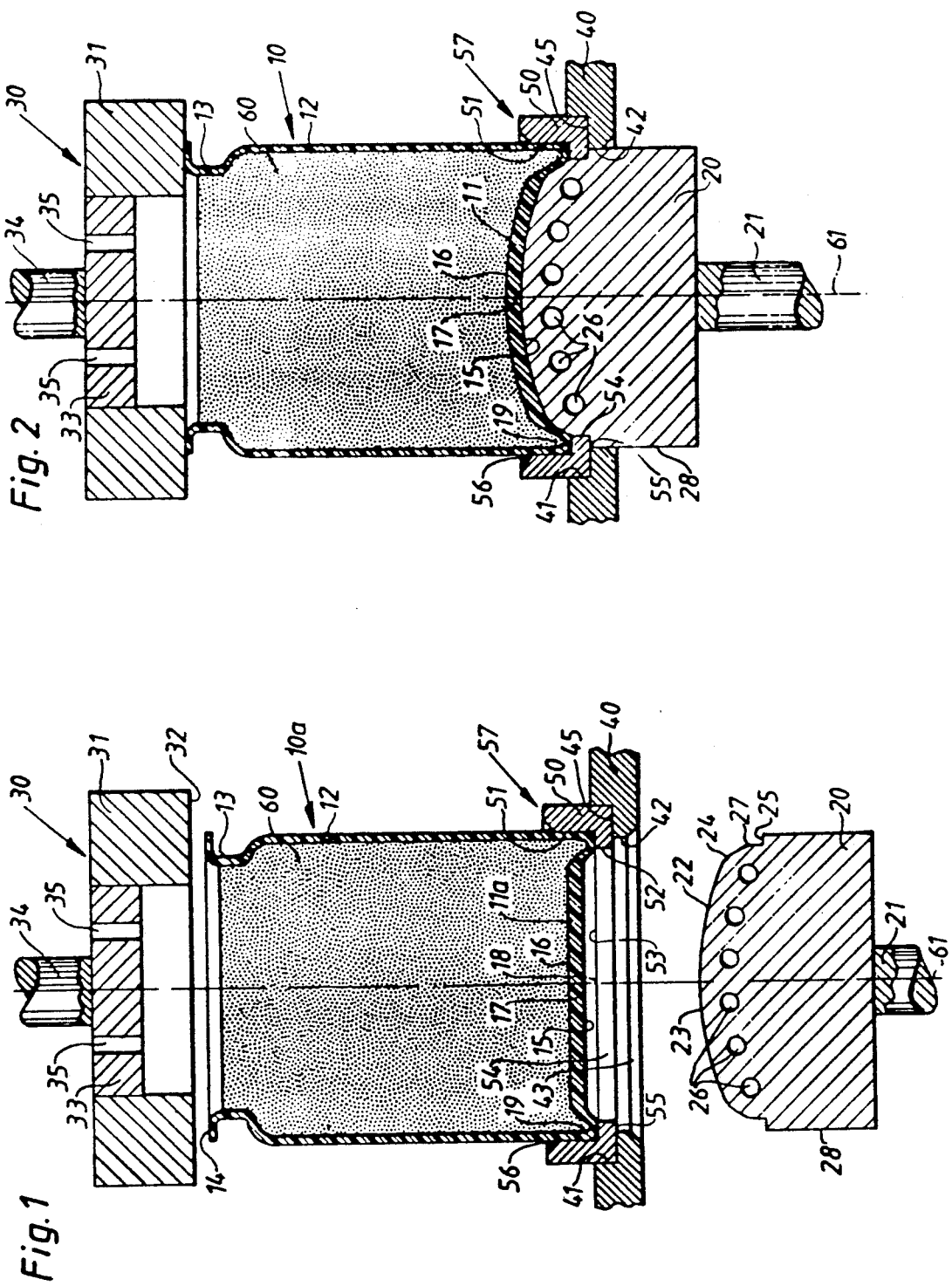

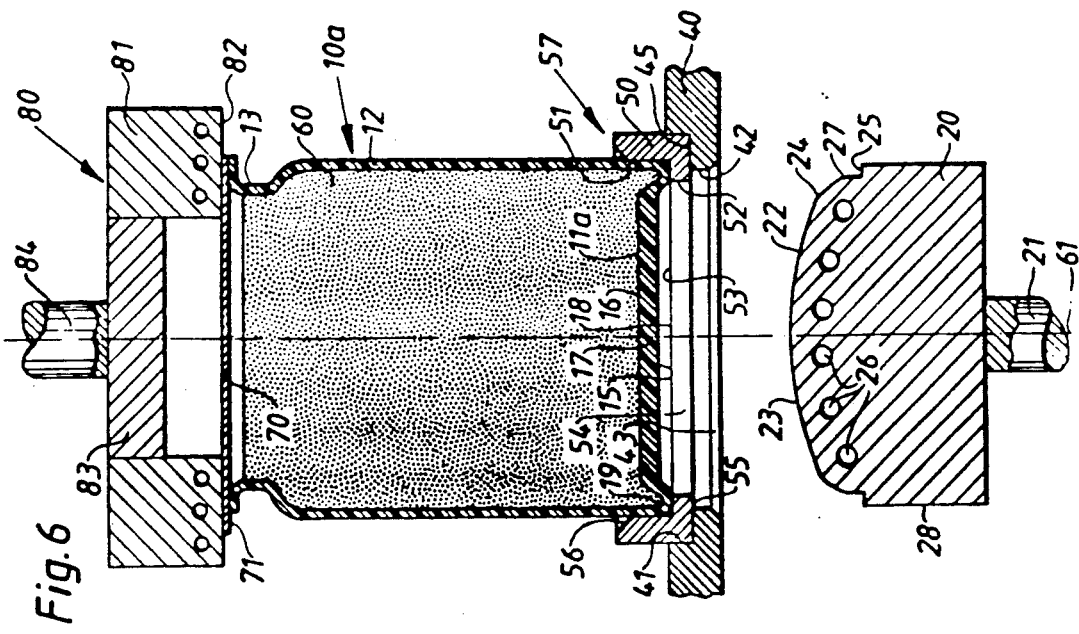
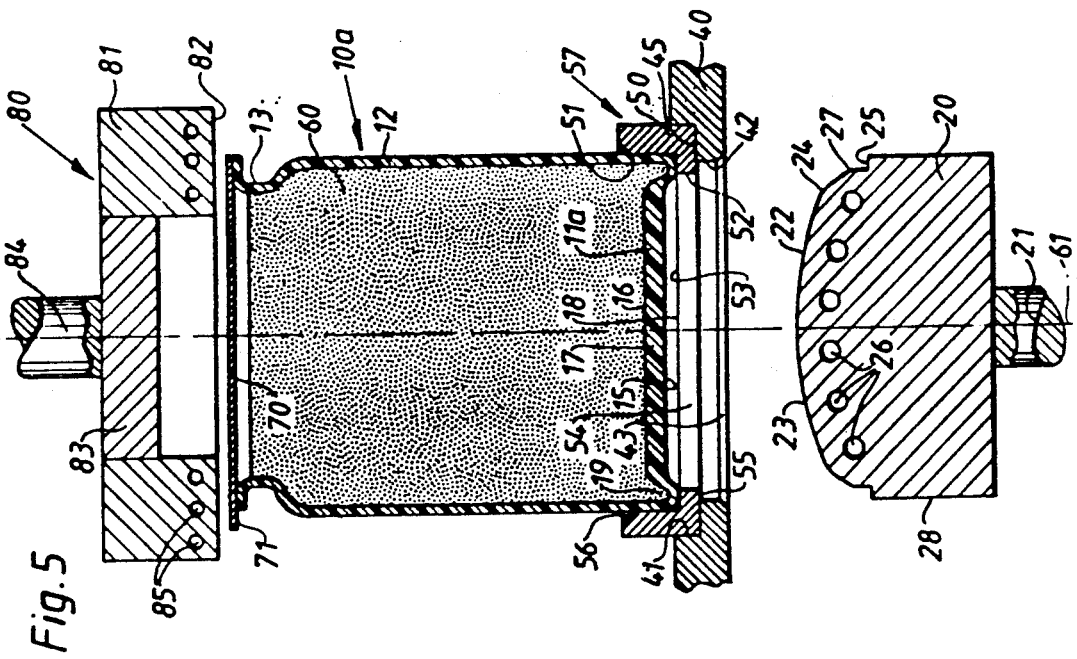

METHOD AND APPARATUS FOR PRODUCING SEALED AND FILLED CONTAINERS

FIELD OF THE INVENTION

The present invention relates to a method and an apparatus for producing sealed and filled containers.

BACKGROUND AND PRIOR ART

In the employment of containers of thermoplastic material, it is necessary, in many physical applications, to ensure that the container—and thereby its plastic material—can tolerate both low and high temperatures without undesired permanent deformation. Similarly, there are demands that the container, after sealing, can withstand relatively large pressure differences between the inner space of the container and the space outside the container, without such pressure difference producing an undesired deformation of the container. The term "deformation" encompasses both the deformation maintained by the pressure differences and that deformation which remains once the pressure differences have been equalized. Wishes have also been expressed on the part of packers and fillers to be able to seal the container as soon as possible—and preferably immediately—after the container has been filled with its contents. In many physical applications, in particular when long-term storage of foods is a consideration, there are requirements that the sealing be carried out such that the connection between the sealing member, for example the lid, and the opening portion of the container be continuous and tight in all of its parts. In such instance, the connection between the sealing member and the opening portion generally consists of a loop which is closed in the circumferential direction. A further desire which has been expressed in this art is that, when the goods are of a more or less liquid nature, the filled and sealed container should have a head space (the space between the sealing member, or lid, of the container and the upper defining surface of the goods) which is as small as possible.

Hence, there are express wishes in the art for a container of plastic material which is suited for high-temperature applications and/or for the storage of liquids under pressure, for example the storage of soft drinks, beer etc. The term high-temperature applications is taken to mean, for example, that the contents in filled and sealed containers are pasteurized (60°-70° C.), that liquid is filled directly into the containers from boiling (hot filling), or that the contents of filled and sealed containers are sterilized (at least 121° C.). It will be obvious to those skilled in the art that, during the heating cycle and cooling cycle, respectively, which take place in connection with pasteurization, hot filling and sterilization, the plastic material is exposed to extreme thermo stresses and/or that considerable pressure differences occur between the interior of the container and its surroundings atmosphere.

In general, it is required that once a container has been supplied with goods and sealed, the goods fill as large a portion of the filling space as possible. In addition, when the goods are of a more or less fluid nature, it is required that the space between the upper defining surface of the goods and the edge of the opening is large so as to minimize the risk that the contents of the as yet unsealed container overflow the edge. It is obvious, that, in case the container is of can form and has a large opening area, both of the above-disclosed requirements are mutually conflicting. In particular in physical applications in which the container, after filling, is moved to a sealing station, the requirement of a large distance between the upper defining surface of the goods and the opening edge is accentuated even further.

A major problem in the tight sealing of a hot-filled container, before its contents have cooled, is that the pressure difference between the inner space of the container and the container's surrounding atmosphere progressively increases as the contents of the container cool, since the pressure within the container progressively diminishes. As a rule, the walls of the container body consist of monoaxially or biaxially oriented material, which implies that the walls of the container will have caved-in or dimpled portions if the container is sealed relatively soon after the filling goods have been supplied to the container.

SUMMARY OF THE INVENTION

The present invention seeks to provide a method and an apparatus in which the above requirements, demands and wishes are satisfied and in which the above problems and drawbacks are obviated.

The container body and, as a rule, also the opening portion of the container, consist of monoaxially and/or biaxially oriented plastic material. The oriented material possesses a good capacity to withstand expansion forces. When the present invention is reduced into practice, the size of the maximum excess pressure within the container is adjusted to levels which entail that the deformation of the walls will be acceptable and/or will return to an acceptable level when the excess pressure has been reduced or no longer prevails. Since, at excess pressure within the container, its bottom portion is influenced by outwardly directed forces, the maximum inner pressure is also adjusted in view of the capacity of the bottom portion to withstand these forces, so as to avoid the risk of harmful deformation to the bottom portion, for instance that the bottom portion is turned inside out.

The present invention includes embodiments in which reforming of the bottom portion takes place once the container has been sealed, or in which a greater or lesser portion of the reforming cycle takes place before the container has been sealed. In the physical applications disclosed in the foregoing, excess pressure will thereby arise in the container in conjunction with the displacement of at least one region of the bottom portion towards the opening portion of the container. This excess pressure is accommodated by the wall and bottom-portion, respectively, of the container body without permanent, unacceptable deformation, or with no deformation whatever, even when the bottom portion and the mechanical tool employed have been separated from one another. As the temperature in the interior of the container falls, the excess pressure diminishes and, in certain physical applications, becomes a partial vacuum.

By selecting a suitable point in time for sealing the container, there will be achieved according to the present invention an adjustment of the largest valve of the excess pressure which occurs within the container, at the same time as the delayed sealing operation in certain physical applications entails that a certain partial vacuum will prevail within the container once its contents have cooled. Hereby, there will be achieved an adaptation to the ability of the container to withstand inner and outer excess pressure without the container being deformed to such an extent that its use is jeopardized. The term deformation is primarily taken to mean the pressure-dependent deformation which occurs in conjunction with filling of the container or in conjunction with subsequent transport, storage and sale. When the present invention is reduced to practice, the point in time for sealing and the size of the deformation are, as a rule, adapted to one another so that neither a partial vacuum nor an excess pressure prevails within the sealed container at normal storage temperature.

By sealing the container after reforming of the bottom portion has commenced or, in certain embodiments, been completed, a reduction of the space will be achieved between the upper defining surface of the filling goods and the sealing member (the lid). The size of the reduction of the space which reforming of the bottom portion produces is, in such instance, adapted to the size of the space between the filling goods and the lid and/or to the distance between the upper surface of the filling goods and the opening edge prior to deformation. In embodiments in which the container is sealed before reforming of the bottom portion or once but a slight part of the reforming of the bottom portion has taken place, an embodiment is generally selected in which the lid possesses resiliently yieldable properties. In this instance, after reforming of the bottom portion, the lid is optionally allowed to bulge outwardly at least in its central regions, while the lid returns, once the contents of the container have cooled, to its original form, or in certain embodiments, in which a partial vacuum occurs in the container, bulges inwardly (as the pressure in the filling space diminishes when the contents cool).

The highest valve of the excess pressure is adapted to, for example, the volume of the container, the temperature-dependent volume change of the filling goods and the size of the space which is not taken up by filling goods etc., for adjusting the pressure within the container at normally prevailing storage temperatures to a lowest valve at which entails that the container is capable of withstanding the forces directed towards the interior of the container without any caved-in portions being formed. In certain embodiments the maximum excess pressure is selected to be at such a value that a partial vacuum never occurs in the container under normal storage conditions.

BRIEF DESCRIPTION OF THE FIGURES OF THE DRAWINGS

FIGS. 1-4 are sections through a first embodiment of the present invention during different stages of formation;

FIGS. 5-7 are sections corresponding to the sections in FIGS. 1-4 for a second embodiment of the present invention.

DETAILED DESCRIPTION

Figure 4:
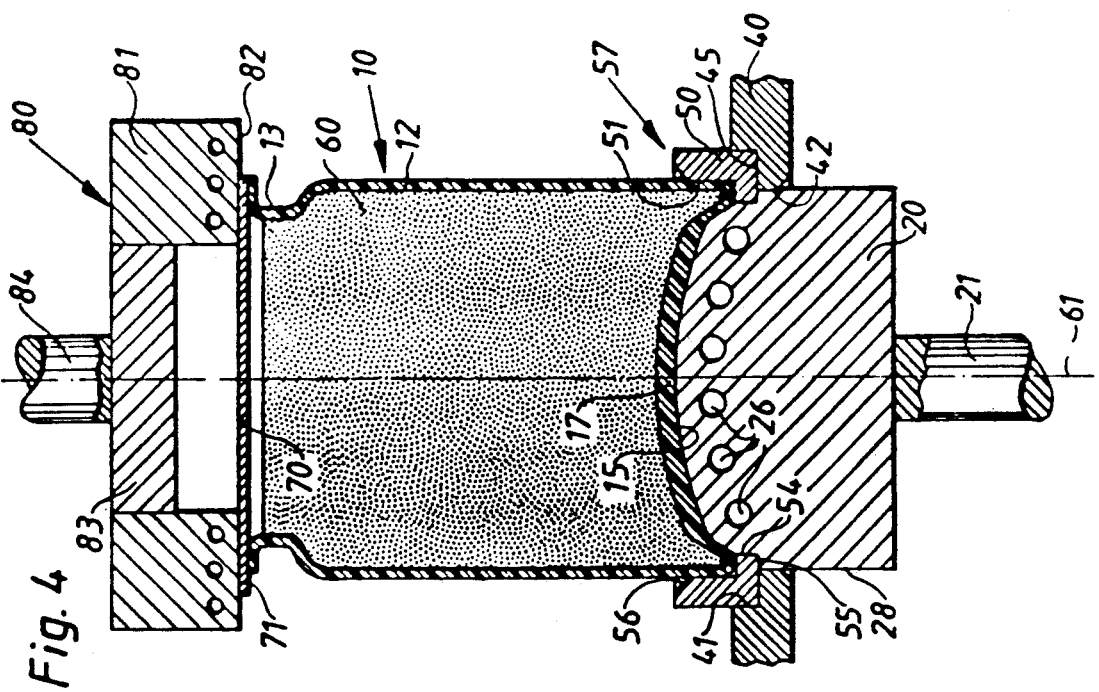
Figure 3:
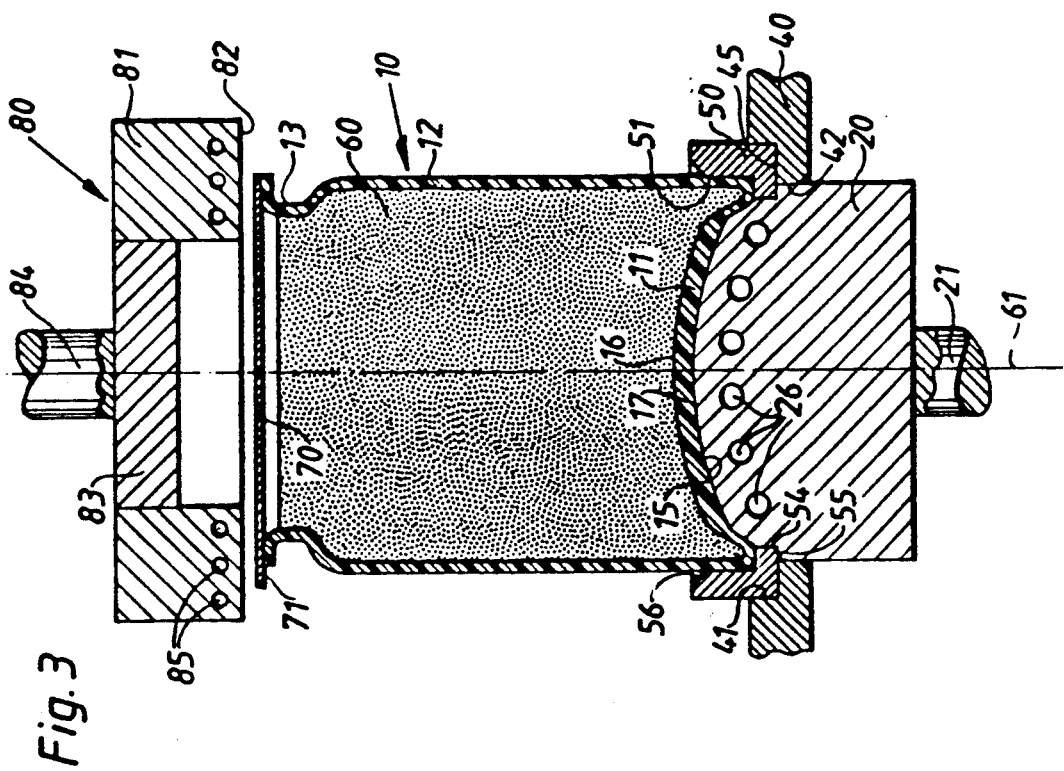

Referring to the drawings, there is shown a container 10 and a preform 10a for the container, respectively. The preform and the container consist of crystallizable plastic material, the preform and the container, respectively, comprising a container body 12, a sealed bottom portion 11a and 11, respectively, and an opening portion 13. The container body and preferably also the opening portion consist, as a rule, of monoaxially or biaxially oriented material. The opening portion has an opening edge 14 which, in the embodiment shown in the drawings, is arranged as an opening flange. The bottom portion 11, 11a is provided with a circumferentially disposed outer portion 19 forming one or more standing surfaces 18 for the container and a central portion 17 located inside thereof and at least in the container being displaced in relation to the standing surface or standing surfaces towards the opening portion of the container. At least in the preform 10a (cf. FIGS. 1 and 5), the central portion consists "substantially of amorphous material. The term substantially amorphous material" is taken to mean that the crystallization is less than 10% and as a rule less than 5%. It will be obvious to one skilled in the art that, in certain embodiments, the central portion 17 of the preform is located flush with the standing surface or standing surfaces of the bottom portion or, in certain embodiments, is located at a lower level. The outwardly facing surface of the bottom portion has reference numeral 15 and its inwardly facing surface has reference numeral 16.

The preform 10a and the container 10, respectively are carried by a step 53 of a circular or polygonal holder 50. The step is located between an upper defining surface 51 facing the center axis 61 of the apparatus and a lower defining surface 52 facing the center axis. The upper defining surface defines, towards the center axis 61, a tube-like member 57 which is dimensioned so as to surround the bottom portion 11a, 11, of the preform and the container, respectively, and, in certain embodiments, also at least the lower portion of the container body 12. In certain embodiments, the tube-like member is of a sufficiently long axial extent to surround at least the major portion of the container body. The inner cross-sectional area of the tube-like member is adapted to the form (configuration) of the preform or the container, and is, for example, circular, elliptical, polygonal, etc. As a rule, the tube-like member 57 is provided with a bevel 56 at its upper portion so as to facilitate placing of the container in the holder. The lower defining surface surrounds an aperture 54. The holder has a downwardly facing abutment surface 55 which rests against an abutment surface 45 on a base or substrate 40.

The substrate 40 is provided with an aperture 43 with an upper surface 41 facing the center axis and a lower surface 42 facing the center axis, the lower surface being of smaller circumference than the upper. The transition between the two surfaces forms a step which constitutes the previously mentioned abutment surface 45 of the substrate 40. The dimensions of the aperture 43 are adapted to the maximum size of the generally annular holder 50 which is employed in the embodiments contemplated here. By such means, adaptation to different sizes and cross-sectional configurations (for example circular, elliptical, polygonal etc.) of the bottom portion and the container body, respectively, will be effected in that each holder 50 has outer dimensions adapted to the dimensions of the aperture 43 of the substrate and inner dimensions adapted to the dimensions and designs of the contemplated preform and container, respectively. In the figures, the annular holder is shown as placed in the aperture of the substrate without the employment of specific holding means. However, it will be obvious to one skilled in the art that such means may be of varying design according to the contemplated application. By way of non-restricting example, mention might be made that the aperture of the substrate and the annular holder are threaded, that the substrate and the annular holder, respectively, are provided with holes for locking pins etc.

A mechanical forming tool 20 constituting a bottom forming device and, as a rule, also a crystallization device, is shown in the figures beneath the substrate 40. The mechanical tool 20 is displaceable through drive means (not shown) by the intermediary of a lower shaft 21 to an upper position (cf. FIGS. 2 and 7) and back to the position shown in FIGS. 1 and 5.

The mechanical tool 20 is provided with an upwardly facing abutment surface 22 with a central portion 23 and an outer circumferential portion 24. In the illustrated embodiment, the abutment surface merges, in an outer circumferential region, into a fitting or guiding surface 27 which forms a substantially vertically directed circumferential surface facing away from the center axis 61 of the apparatus. The fitting surface 27 is adapted to the lower defining surface 52 of the annular holder 50 facing the center axis, so as to be displaceable to a position where the fitting surface 27 is surrounded by the lower defining surface 52 of the annular holder 50. The fitting surface merges into an outwardly directed abutment surface 25 which cooperates with the abutment surface 55 of the annular holder. Finally, the mechanical tool has a lower, outwardly facing defining surface 28 which connects to the abutment surface 25 and is dimensioned so as generally to fit into the aperture 43 of the substrate 40 (cf. FIG. 2). Means 26 for raising the temperature of the abutment surface of the bottom forming device (for example heating coils, ducts for a heat carrier medium), are included in the mechanical tool. The abutment surface 22 is of a convex form at least in its central region.

In a preferred embodiment according to the present invention, an upper counter support 30 is displaceable, by means of an upper shaft 34, between a first position (cf. FIG. 1), where space is provided to place the preform 10a in the holder 50, and a second position where support 30 rests against the opening edge 14 of the container (cf. FIG. 2). The counter support 30 is provided with a circumferential abutment portion 31 with an abutment surface 32 for cooperation with the opening edge 14. A central connection portion 33 includes channels 35 which, with the counter support resting against the opening edge, connect the space beneath the counter support 30 with the ambient atmosphere. The central connection portion 33 constitutes anchorage means for the upper shaft 34. It will be obvious to one skilled in the art that the upper counter support is, in certain embodiments, displaced laterally so as to permit placing of the preform in the annular holder 50.

FIGS. 3-7 illustrate an alternative embodiment of the present invention in which the upper counter surface support 30 is replaced by a sealing member 80 disposed above the opening portion of the preform 10a and the container 10, respectively. The sealing member 80 comprises a circumferential abutment portion 81, for example one or more heat-sealing jaws, welding jaws, etc., a central connection portion 83 and a drive shaft 84 connected to the central connection portion.

The circumferential abutment portion is provided with one or more abutment surfaces 82 which are turned to face the opening edge of the container. The figures also show a seal 70, for example a lid, a wafer etc., provided with a gripping device 71. The abutment portion also includes means for sealingly connecting the seal to the opening portion of the container. Thus, in certain embodiments the abutment portion includes a sonotrode for fixing the wafer to the opening portion by means of ultrasonic welding, while in other embodiments means 85 are provided for raising the temperature of the abutment surface 82 of the abutment portion, for example electrical heating coils or ducts for a thermal medium.

By means of the drive shaft 84, the sealing member 80 is displaceable between a first upper position (cf. FIGS. 3 and 5), and a second lower position (cf. FIGS. 4, 6 and 7), in which position the sealing member abuts against the wafer and urges this towards the opening portion of the container.

Figure 8:
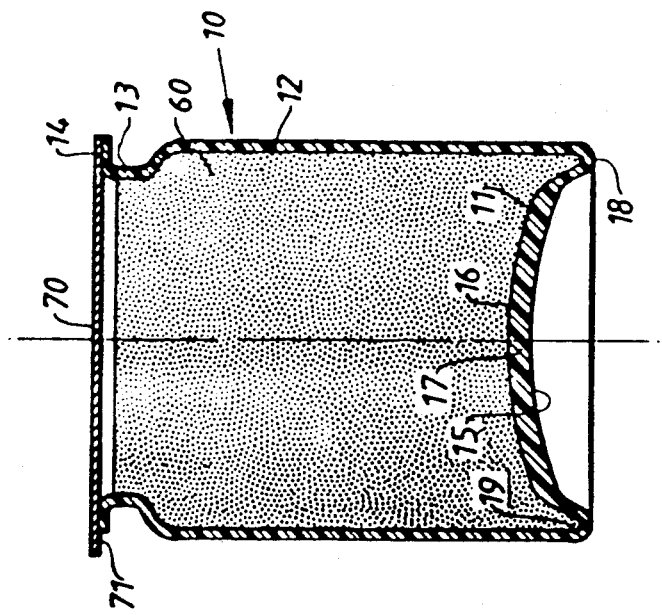
FIG. 8 is an axial section through a filled container.

FIG. 8 shows a section through the container 10 once the filling goods in the container have cooled. In this figure, as in the preceding figures, the preform and the container, respectively, are shown as having been supplied with filling goods 60.

Figure 7:
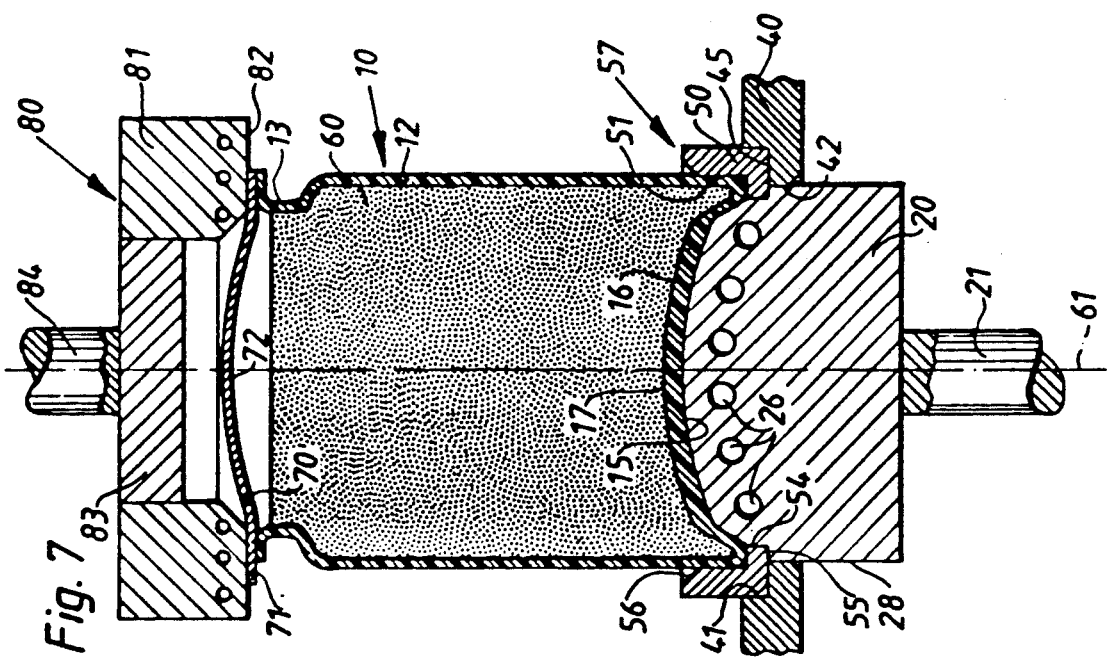

The preform 10a is placed in the holder 50 after it has already been filled with goods 60 or it is filled with goods after being placed in the holder. The goods are generally supplied to the preform at a temperature in excess of 50° C., preferably in excess of 70° C. and generally in excess of 90° C. The bottom forming tool 20 is subsequently displaced upwardly from the position shown in FIGS. 1 and 5 to assume the position which is shown in FIGS. 2 and 7, respectively. The abutment surface 22 of the bottom forming tool 20 is, in such instance, at an elevated temperature, as a rule a temperature exceeding the glass transition temperature (Tg) of the material. In a preferred embodiment, the temperature of the abutment surface is adjusted by means of the heating device 26 to a value slightly in excess of the temperature at which the speed of thermocrystallization of the plastic material is at its highest, preferably at a temperature exceeding this temperature by at least 5° C. and generally exceeding this temperature by at least 10° C. Thermal energy from the filling goods is added to the thermal energy from the bottom forming tool and thereby the thermoplastic material of the bottom portion, on abutment against the abutment surface of the bottom forming tool, rapidly reaches a temperature above the Tg of the material. At this point, the material softens and reforming of the bottom portion is facilitated at the same time as the material thermally crystallizes.

In the employment of, for example, polyethylene terephthalate, hereinafter abbreviated PET, thermocrystallization takes place very slowly as long as the material temperature is less than 90°-100° C. whereafter at increasing temperature the crystallization increases rapidly. The crystallization speed is also pressure dependent, but at those pressure forces which are relevant in the application of the present invention, the effects of the pressure forces on crystallization are essentially negligible, whereby the maximum crystallization speed will be obtained for PET if the material is at a temperature within the range of 135°-145° C.

In certain embodiments, depending upon the type of plastic material and choice of temperatures, reforming speed, material thickness etc., such great upwardly-directed pressure forces are required against the bottom of the preform that these forces cannot be compensated by the gravitational forces developed by the preform and the filling goods. In such embodiments, the upper counter support 30 or the sealing member 80 is displaced into abutment against the opening portion and hereby ensures that the preform is held in place and that the abutment surface 22 of the bottom forming tool securely abuts against the bottom portion. The forming tool 20 thereafter returns to its lower position (cf. FIG. 1) after sufficient time has elapsed with the bottom forming tool in the upper position so that the material in the bottom portion has achieved the desired crystallization. As a rule, thermo crystallization is allowed to continue until such time as the material has a crystallization of at least approx. 15%, generally at least approx. 20% and, in a preferred embodiment, at least approx. 25%. In the case of PET it has proved to be appropriate to allow crystallization to continue for such a length of time that at least the material most proximal the defining surface of the bottom portion becomes opaque. The upper counter support 30 is thereafter displaced from the position illustrated in FIG. 2, and replaced by the sealing member 80, after a closure, for example a wafer 70, has been placed over the opening of the container. The sealing member 80 is displaced from its initial position (cf. FIG. 3) to a working position (cf. FIG. 4) where it urges the wafer against the opening edge of the container. A joint will hereby be formed between the wafer and the opening edge. In some embodiments, the joint is achieved in that the abutment surface 82 of the circumferential abutment portion 81 is at such a high temperature that the wafer is sealed, by means of glue which melts, or by means of hot welding, to the opening portion. In other embodiments, the sealing member includes an ultrasonic welding sonitrude for producing a welding joint.

In an alternative embodiment of the present invention (cf. FIGS. 5-7) reforming of the bottom portion is effected wholly or partly after the container has been sealed. In such instance, the sealing member 80 is allowed to absorb forces upwardly directed from the bottom reforming tool, at least after the sealing of the container has commenced. In such embodiments, fixing of the seal against the opening edge of the container by means of ultrasonic welding is preferred, since the sealing member may thereby be kept at a low temperature and heating of the plastic material at the opening portion is avoided. However, it will be obvious to one skilled in the art that, in certain applications, sealing members with elevated temperature at the abutment surface 82 are employed. The temperature and the properties, respectively, of the connection means for fixedly securing the wafer to the opening portion are selected such that a relatively lengthy abutment of the abutment surface against the wafer and consequential heating thereof and of the opening portion do not cause any problems.

On the reforming of the bottom portion, excess pressure arises within the container. In a preferred embodiment of the present invention, the wafer (the lid) consists of resiliently yieldable material, for which reason the excess pressure causes the wafer, in a central region, form an outward bulge 72 (cf. FIG. 7). In order to region, form an outward bulge 72 (cf. FIG. 7). In order to ensure that the bottom portion is capable of withstanding the excess pressure, the bottom forming tool 20 is retained in its upper position (cf. FIG. 7) for such a length of time that the above crystallization levels are achieved. Thereafter, the bottom forming tool and the sealing member return to their initial positions and the container is removed from the holder 50.

Examples of pressure variations in the physical application of the present invention and employment of containers of PET are that the excess pressure within the container, after reforming of the bottom portion is allowed to reach 0.2 bar and that the dimensions of the container, the size of the space between the filling goods and the wafer and the material properties of the container are selected such that, when the container cools, the pressure is reduced within the container by approx. 0.2 bar, whereby it will be ensured that, at room temperature, largely the same pressure will prevail within the container as outside. Hereby, the outward bulging 72 will disappear when the wafer returns to its original form (cf. FIGS. 7 and 8). In certain embodiments, the size of the reduction of the filling space of the container produced by reforming of the bottom portion is adapted such that, when the filling goods have cooled, a certain partial vacuum or excess pressure prevails in the container. This implies that the lid (the wafer) will have a permanent inward bulging or outward bulging which indicates that the seal is tight and also demonstrates that the container has not been tampered with. In such cases, an outer protective lid is, as a rule, employed —this being dimensioned so as to withstand mechanical stresses in the form of jolts or jerks during transport and handling of the container. The wafer (the inner lid) is more elastic than the rest of the container, for which reason the partial vacuum will not cause undesirable deformation of the opening portion of the container its body or bottom portion, which could lead to rejection of the package by the consumer.

FIG. 8 shows a container which has been sealed with the filling goods in the warm state, the bottom of the container being thereafter reformed and in which the temperature of the filling goods and the extent of the reforming have been adjusted so that the pressure reduction which occurs in the interior of the container in conjunction with the temperature reduction is such that the seal (wafer) 70 of the container has reassumed its original form and forms a substantially planar lid.

The temperature of the abutment surface of the bottom shaping tool is selected, in certain embodiments, to be at relatively high levels. Thus, it has proved to be possible to employ, for PET, temperatures of up to approx. 220° C., i.e. a temperature which is less than the melting temperature of the material by approx. 25° C., and at the same time achieve the desired crystallization levels in the material in the bottom portion. The advantage inherent in such high temperatures is that, after the crystallization, the material is mechanically stable up to very high temperatures.

The above description relates to fundamental embodiments of the present invention. In order to achieve the contemplated capacity in filling equipment, for example the substrate is disposed as a rotary table with a plurality of apertures 43 and annular holders 50 cooperating therewith.

The present invention should not be considered as restricted to that described above and shown on the drawings, many modifications being conceivable without departing from the spirit and scope of the appended claims.

What is claimed is:

1. A method of producing a sealed and filled container comprising providing a preform of crystallizable plastic material having a body, a closed bottom portion and an open mouth portion, filling the preform with goods to be sealed therein, applying a mechanical forming and thermocrystallizing tool against the closed bottom portion of the preform, with pressure, to reshape the bottom portion of the preform by displacing at least a part of the bottom portion of the preform inwardly of the body towards the open mouth of the preform, heating the tool at the surface thereof applied against the bottom portion of the preform to raise the temperture of said bottom portion to a value greater than the glass transition temperature (Tg) of the plastic material, maintaining contact of the heated tool with the bottom portion during its reshaping for a length of time sufficient for the plastic material to obtain thermocrystallization of at least 15% at least at the surface in contact with said tool, the thermocrystallization of the bottom portion causing strengthening of said bottom portion and mechanical stability in its reshaped state to resist deformation and relatively high tempertures, and sealing said open mouth portion to produce a sealed and filled container.

2. A method as claimed in claim 1 comprising heating the goods to a temperature of at least 50° C. before filling the preform.

3. A method as claimed in claim 1 comprising heating the goods to a temperature of at least 90° C. before filling the preform.

4. A method as claimed in claim 1, said sealing of said open mouth being effected after at least a major part of said bottom portion of the preform has been reshaped by said tool.

5. A method as claimed in claim 1 comprising effecting said sealing of the open mouth portion before the reshaping of the bottom portion of the preform.

6. A method as claimed in claim 1 comprising effecting contact of the tool with said bottom portion of the preform before the goods are filled in the preform.

7. A method as claimed in claim 1 comprising effecting contact of said tool with substantially the entire bottom portion of the preform.

8. A method as claimed in claim 1 wherein said bottom portion of the preform includes a region formed of amorphous material and said tool contacts said region of amorphous material.

9. A method as claimed in claim 8 wherein said tool effects thermocrystallizing of said region to an extent to produce opacity of said region at least at the surface thereof in contact with said tool.

10. A method as claimed in claim 1 wherein said open mouth portion is sealed by heating a lid to seal the same on the body and cover said open mouth portion.

11. A method as claimed in claim 10 comprising applying counter pressure at said open mouth portion while the tool applies pressure to said bottom portion to reshape the same.

12. A method as claimed in claim 11 comprising utilizing a counter support to apply the counter pressure at said open mouth portion and applying heat to said lid from said counter support to seal the lid to said body.

13. A method as claimed in claim 12 comprising providing a central opening in said counter support and a rim around said opening which is pressed into contact with said lid, said lid undergoing deformation when the bottom portion is reshaped and the lid closes said open mouth, said opening in the counter support receiving the deformed lid.

14. A method as claimed in claim 1 wherein said bottom portion of the preform is reshaped by said tool by permanently deforming said bottom portion to an inwards convex shape while concurrently effecting thermocrystallation thereof.

15. Apparatus for producing a sealed and filled container from a preform of crystallizable plastic material having a body, a closed bottom portion and an open mouth portion, said apparatus comprising holder means for supporting a preform at the bottom portion thereof in a perimetral region while leaving the bottom portion exposed at an opening in said holder means within said perimetral region, means for filling the preform with goods to be sealed therein, a mechanical forming and thermocrystallizing tool supported for displacement adjacent to said holder means to traverse said opening and bear against the closed bottom portion of the preform, with pressure, to reshape the bottom portion of the preform by displacing at least a portion of the bottom portion of the preform inwardly of the body towards the open mouth of the preform, means for heating the tool at the surface thereof applied against the bottom portion of the preform so that the temperature of said bottom portion is greater than the glass transition temperature (Tg) of the plastic material, stop means between the holder means and said tool for limiting the passage of the tool through said opening and for maintaining contact of the heated tool with the bottom portion during reshaping of the latter for a length of time sufficient for the plastic material to obtain a total thermocrystallization of at least 15% at least at the surface in contact with said tool, and means for sealing said open mouth portion to produce a sealed and filled container.

16. Apparatus as claimed in claim 15 wherein said holder means includes a step on which the perimetral region of said bottom portion can rest.

17. Apparatus as claimed in claim 15 comprising counter support means for applying counter pressure to the preform during the reshaping of said bottom portion.

18. Apparatus as claimed in claim 17 wherein said counter pressure means is disposed to apply counter pressure to the preform at the open mouth thereof, said apparatus further comprising heating means for heating said counter support means to effect the sealing of the open mouth portion.

19. Apparatus as claimed in claim 18 wherein said sealing of the open mouth portion is effected by a flexible lid, said counter support means comprising an annular member with an interior opening, said annular member being applied to said lid, said interior opening permitting the lid, when deformed, to pass therein.

20. Apparatus as claimed in claim 15 wherein said tool has a convex surface for reshaping the bottom portion from a flat state to an inwardly curved shape and thermocrystallizing the inwardly curved bottom portion.

* * * * *